United States Patent [19]
Laughlin

[11] Patent Number: 5,820,113
[45] Date of Patent: Oct. 13, 1998

[54] ENGINE MOUNT ACTUATOR FOR REDUCING VIBRATIONAL FORCES

[75] Inventor: Darren R. Laughlin, Albuquerque, N. Mex.

[73] Assignee: A-Tech Corporation, Albuquerque, N. Mex.

[21] Appl. No.: 640,655

[22] Filed: May 1, 1996

[51] Int. Cl.$^6$ ............................................... F16F 5/00
[52] U.S. Cl. ..................... 267/140.15; 188/267; 248/550
[58] Field of Search .................................. 248/550, 559, 248/562, 563, 635, 636, 638, 652, 659; 267/140.15; 188/267

[56] References Cited

U.S. PATENT DOCUMENTS

| | | | |
|---|---|---|---|
| 4,083,433 | 4/1978 | Geohegan, Jr. et al. | 188/1 B |
| 4,624,435 | 11/1986 | Freudenberg | 248/659 |
| 4,664,219 | 5/1987 | Hoerig et al. | 180/291 |
| 4,687,171 | 8/1987 | Freudenberg | 248/636 |
| 4,699,348 | 10/1987 | Freudenberg | 267/140.15 |
| 4,759,534 | 7/1988 | Hartel | 188/267 |
| 4,869,474 | 9/1989 | Best et al. | 267/136 |
| 5,238,232 | 8/1993 | Kobayashi et al. | 248/550 |
| 5,409,078 | 4/1995 | Ishioka et al. | 180/300 |
| 5,427,347 | 6/1995 | Swanson et al. | 248/550 |
| 5,445,249 | 8/1995 | Aida et al. | 188/267 |
| 5,549,284 | 8/1996 | Lee | 248/550 |

FOREIGN PATENT DOCUMENTS

| | | |
|---|---|---|
| 61-220924 | 10/1986 | Japan . |
| 3-219139 | 9/1991 | Japan . |
| 4-113927 | 4/1992 | Japan . |

*Primary Examiner*—Leslie A. Braun
*Assistant Examiner*—Gwendolyn Baxter
*Attorney, Agent, or Firm*—Pollock, Vande Sande & Priddy

[57] ABSTRACT

An engine mount actuator having an upper casing open at one end, and connected at an opposite end to an engine mounting bolt. The engine mounting bolt extends within the casing and is supported by a bushing which is in turn laterally supported by an elastomeric isolator disk within the upper casing. A lower casing including a frame mounting bolt at one end, and opened at another end faces the opened end of the upper casing. A mounting flange is supported between the upper and lower casing open ends supports a stator, having first and second toroidal windings which define a circumferential space. A circumferential magnet assembly includes a permanent magnet means supported within the circumferential space, and is coupled to the engine mounting bolt through a spherical bearing. The magnet assembly produces a force against the engine mounting bolt in response to a current through the first and second toroidal windings. Counter vibratory forces may therefore be applied to the engine mounting bolt for suppressing vibrations from being transferred to the frame.

15 Claims, 3 Drawing Sheets

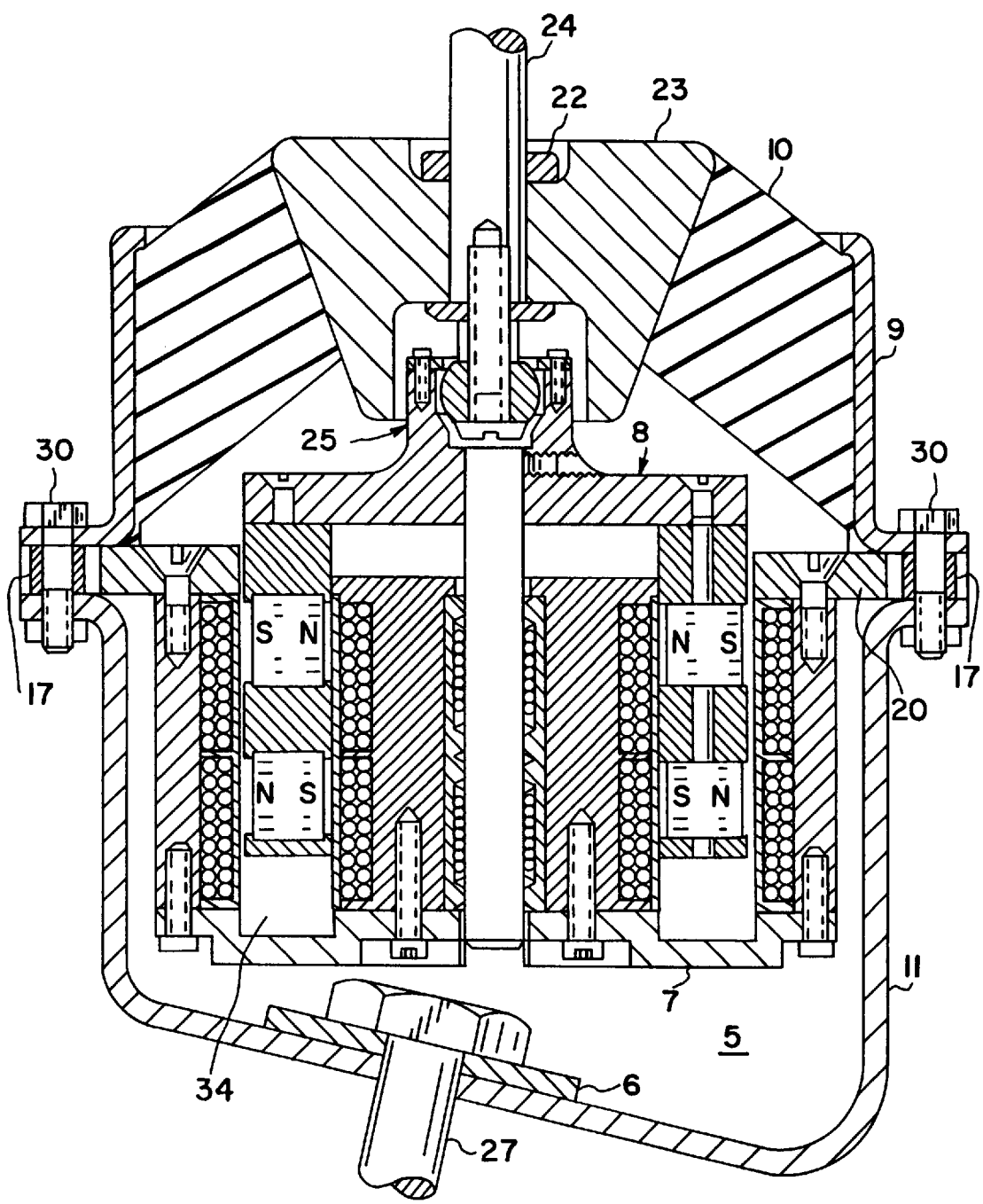
FIG. I

ENGINE MOUNT ACTUATOR FOR REDUCING VIBRATIONAL FORCES

BACKGROUND OF THE INVENTION

An actuator device is described which reduces the vibrational forces imparted by an internal combustion engine to the interior of a vehicle. Specifically, an electromagnetic actuator is described which may be implemented in an engine mount for generating a force for canceling vibrational forces induced by the internal combustion engine on the vehicle frame.

One of the desirable marketing features for a passenger automobile is reduced passenger compartment noise and vibrations. The principle source for passenger compartment noise and vibrations is the internal combustion engine supported to the frame of the automobile. The internal combustion engine produces vibrational forces, typically within the bandwidth of 8 to 50 Hz which are torsional in nature. Conventional engine mounts which support the engine to the automobile frame are designed to help reduce the amount of vibrations induced in the automobile frame. The mount typically includes an upper casing connected to the engine and a lower casing connected to the frame, and the casings are in turn fastened together. The upper casing contains a metal bushing supporting an engine mounting bolt connected to the engine. The metal bushing is in turn supported by a rubber disk to the upper casing. The rubber disk provides some damping of the engine vibrations, and is capable of compressing a few millimeters under the static load of the engine. The lower casing is attached to the vehicle frame via a frame bolt. Typically three or four of such mounts are used to support the engine to the automobile frame.

Various attempts have been made to improve upon the isolation of the automobile passenger compartment and frame from the internal combustion engine. A number of patents have issued relating to the use of electromagnetic vibration devices for canceling the vibratory forces generated by the internal combustion engine. Such attempts are described in U.S. Pat. Nos. 4,699,348, 4,869,474, 4,083,433 and 4,664,219. These devices are utilized in a closed loop which includes a vibration sensor, and an actuator connected to the engine mount. The sensed vibrations are used to create a damping force in opposition to the engine vibration.

Some of the foregoing devices require significant changes from conventional engine mounting to implement the vibration reducing transducers. Hence, there is a need for a force transducer having a mechanical configuration which is capable of replacing a conventional engine mount without any significant redesign or reconfiguration of the attachment between frame and engine.

SUMMARY OF THE INVENTION

It is an object of this invention to provide a engine mount actuator for reducing vibration imparted from a internal combustion engine to an automobile frame.

It is a more specific object of this invention to provide an actuator which is compatible with present day engine mounting arrangements.

These and other objects of the invention are provided by an electromagnetic actuator incorporated within an existing engine mounting structure which generates a counter vibratory force to engine produced vibrations. The electromagnetic actuator is supported by a mounting flange located between the upper and lower casings of a conventional mounting structure. The electromagnetic actuator and mounting flange may be displaced in a lateral direction in order to compensate for side loads imparted by the engine to the electromagnetic actuator. The actuator of the preferred embodiment has a stator with first and second concentric windings which define a circumferential space there between. A magnet assembly is disposed within the circumferential space, and is coupled to an engine mounting bolt in the upper casing. An electromagnetic current through the stator windings displaces the magnet assembly and the coupled engine mounting bolt along the axis of the engine bolt in a direction to counteract vibrational forces induced by the engine on the mounting bolt. In a preferred embodiment of the invention, the magnet assembly is coupled via a bearing and spherical bushing assembly to the engine mounting bolt. An alignment shaft coaxial to the engine mounting bolt extends through a bore in the stator and supports the magnet assembly for sliding movement within the circumferential space between stator windings.

DESCRIPTION OF THE FIGURES

FIG. 1 is a section view of an actuator in accordance with a preferred embodiment of the invention.

DESCRIPTION OF THE PREFERRED EMBODIMENT

Figure 3:
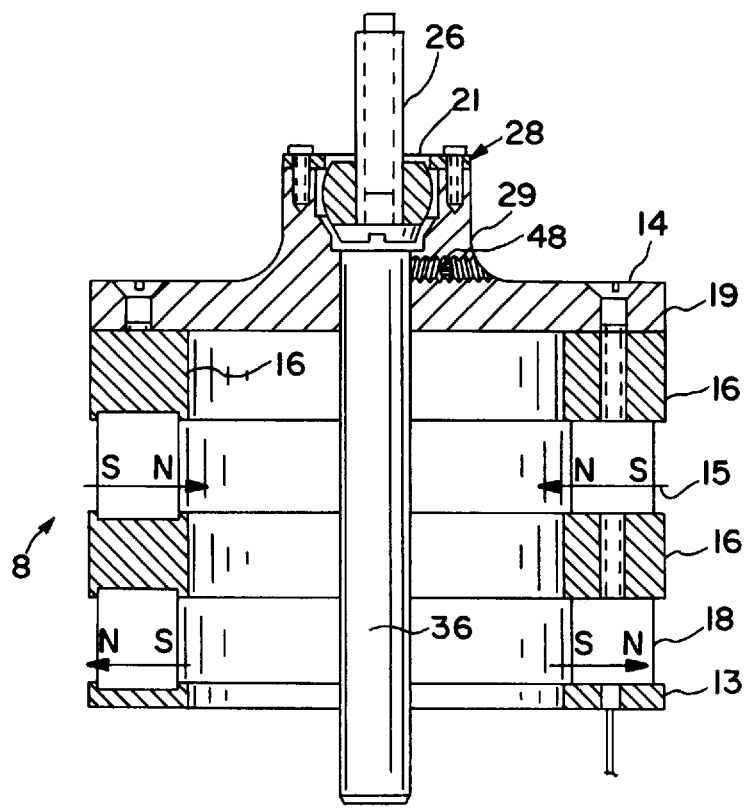
FIG. 3 illustrates the configuration of the stator used within the actuator of FIG. 1.

Referring now to FIG. 1, there is shown an electromagnetic actuator 5 in accordance with a preferred embodiment of the invention. The electromagnetic actuator 5 is supported within a conventional engine mounting structure, and generates a counter vibratory force between engine mounting bolt 24 and frame mounting bolt 27. The conventional mounting structure includes a lower casing 11, facing an upper casing 9 and connected thereto by a plurality of mounting bolts 30. The upper casing 9 includes an elastomeric isolator disk 10, supported against the inner wall of upper casing 9. A engine support bushing 23 within the upper casing 9 is connected to the mounting bolt 24 by a fastener 22. The elastomeric isolator disk 10 compresses in response to the weight of the engine supported by mounting bolt 24, and serves to dampen engine vibrations transmitted by mounting bolt 24.

The lower casing 11 is connected to the engine frame via a frame mounting bolt 27 and an associated washer 6.

The electromagnetic actuator 5 in accordance with the preferred embodiment includes a stator assembly 7 supported on a flange 20, captivated between the upper and lower casings 9 and 11, and a moving magnet assembly 8 which moves into and out of a circumferential space 34 provided by stator assembly 7. The magnet assembly 8 is in turn coupled by a bearing assembly 25 to the engine mounting bolt 24.

Figure 2:
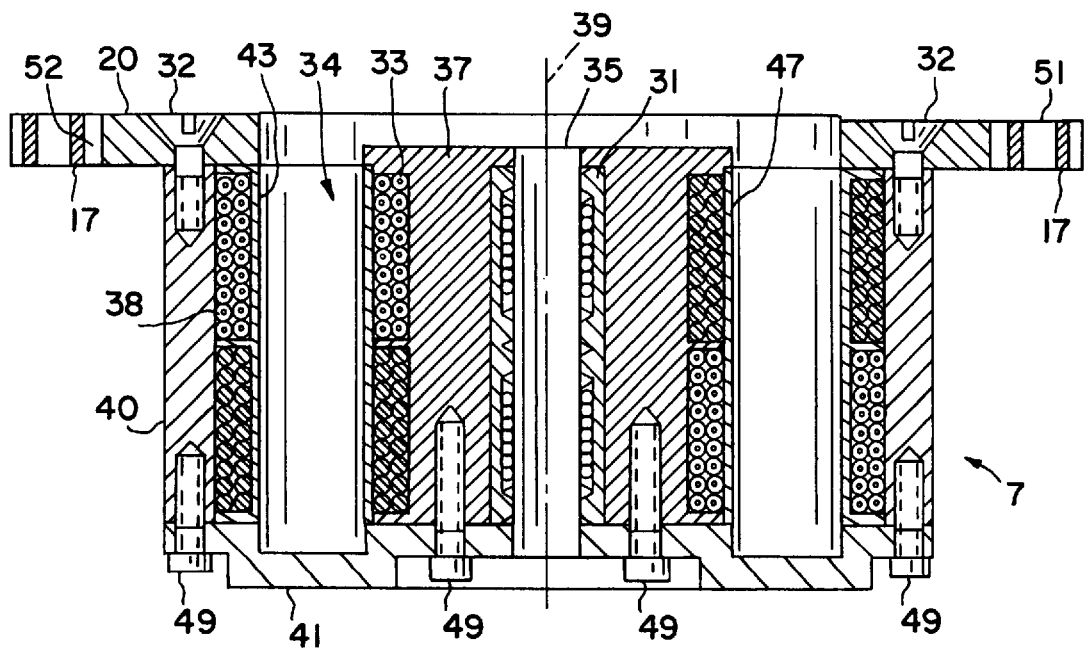
FIG. 2 illustrates the permanent magnet assembly used in the actuator of FIG. 1.

The stator 7 includes as shown in FIG. 2 inner and outer windings 33 and 38. The inner winding 33 is in two upper and lower segments and each segment is wound concentric to the force axis 39 for the device on coil form 37. The outer winding 38 is also formed in an upper and lower segment and supported by a non-ferrous coil form 43. Each of the segmented windings carry a current in opposite directions from each other producing an additive force with oppositely disposed groups of magnets 15 and 18 of the magnet assembly 8.

The magnetic circuit of the stator 7 includes an exterior ferrous cylinder 40 and an internal ferrous coil form 37. The coil forms 37, 43 and outer case 40 for the stator 7 are connected together along the bottom thereof with a nonferrous face plate 41 by fasteners 49. Thus, the magnetic flux is confined between coil form 37 and ferrous tube or cylinder 40 to produce the maximum magnetic flux orthogonal to the inner and outer coils 33 and 38. The outer case 40 is in turn held by fasteners 32 to the floating flange 20. Floating flange 20 includes oversized openings 51 and 52, which receive the bushing 17. The bushing member 17 is selected to be approximately 20 mils higher than the thickness of the flange 20. In this way, any side loads imparted by the engine mounting bolt 24 with respect to the frame mounting bolt 27, will induce a small degree of lateral movement of the flange 20 and the entire stator 7 in a direction to reduce side loading. A linear slide bearing 31 is included in a central bore 35, of the stator 7 coaxial to the force axis 39. The slide bearing 31 is adapted to receive an alignment shaft 36 on the magnet assembly 8 of FIG. 3.

The magnet assembly 8 is coupled by a bearing assembly 25 including a bearing cap 28 and spherical bearing 21 to the engine mounting bolt 24. The assembly includes a receptacle 29 integral with the magnet assembly support plate 19 of the magnet assembly 8. A pan screw 26 holds the spherical bearing 21 to the engine mounting bolt 24, and the bearing cap 28 connects the spherical bearing 21 to the magnet assembly 8. The spherical bearing assembly will permit rotation in three degrees if the engine rocks or twists.

Referring now to FIG. 3, the magnet assembly is shown which includes first and second permanent magnet arrays 15 and 18, which are disposed about a circumference to coincide with the position of the circumferential space 34 defined by the stator assembly 7 of FIG. 2. The magnet assembly is divided into an upper and lower circumferential assemblies 15 and 18. The magnets of the assemblies are held in place with spacers 16 captivated by a magnet holder 13 and a magnet assembly support plate 19. Two toroidally shaped magnets may be used in place of discrete permanent magnets of each of the assemblies 15 and 18. Threaded screws 14 hold the entire magnet assembly together.

The alignment shaft 36 is held at one end by a set screw 48 in the bearing assembly 25, and is received in the slide bearing 31 coaxially located with the force axis 39, so that the magnet arrays 15 and 18 may be accurately located within the circumferential space 34 of the stator 7. Once located, the engine mount 5 under load positions the upper and lower magnet arrays 15 and 18 adjacent the upper and lower segments of inner and outer windings 33 and 38.

In operation, the inactivated actuator does not support the engine, but relies upon the conventional elastomeric support 10 for support. The actuator is specifically designed to axially push and pull the engine mounting bolt 24, by means of a force generated along the force axis 39. Using a control system in accordance with the prior art devices noted previously, the dynamic forces produced by the engine which fluctuate above and below the nominal static load can be reduced if not eliminated. These forces tend to have a magnitude in the plus or minus 20 pound range, and within a vibrational frequency spectrum out to 100 Hz.

The actuator produces a linear force between the upper magnet assembly 8 and the lower stator 7 section along the force axis 39, which is parallel to the support axis for the engine mount. The force produced is proportional to an input current through the inner and outer coil windings, which may be advantageously connected in series, and the magnetic flux density from the permanent magnets which is radial in nature. In the preferred embodiment, the upper magnet assembly 15 has a north/south polarity which produces a radially inward magnetic flux field whereas the lower magnetic assembly 18 has north/south polarity which produces a radially outward magnetic flux field. The windings in the lower sections in both the inner and outer windings 33 and 38, are wound in opposite directions, and the magnetic field vector through the upper inner/outer coil sections is opposite from the magnetic field vector through the lower inner and outer coil sections. The total force produced by the electromagnetic actuator is as follows:

$$F_z = I\phi B_r (N_i 2\pi r_i + N_o 2\pi r_o),$$

where,
 $F_z$=axial Force [N]
 $I_\phi$=input current [A]
 $B_r$=radial magnetic flux density [T]
 $N_i$=number of inner winding turns within the magnetic field
 $N_o$=number of outer winding turns within the magnetic field
 $r_i$=mean inner coil radius [m]
 $r_o$=mean outer coil radius [m]

The inner and outer coil windings are generally connected in series but can also be connected in parallel for certain applications.

Figure 4:
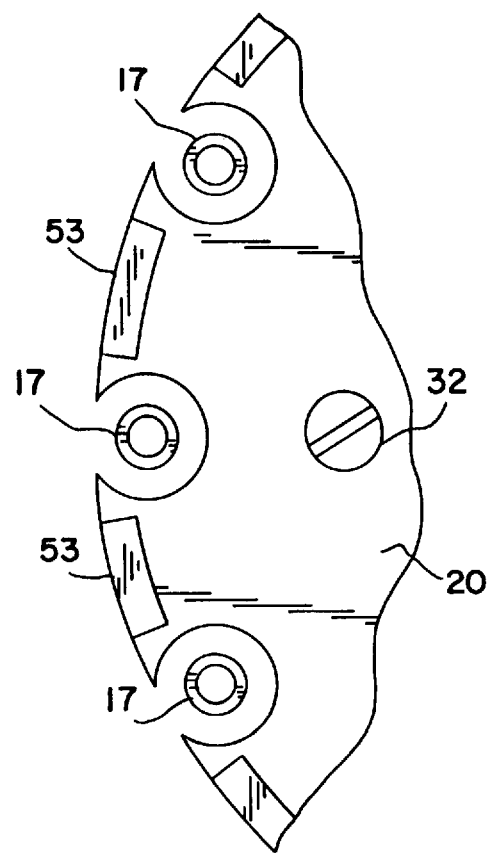
FIG. 4 is a top partial view of the floating flange 20.
Figure 5:
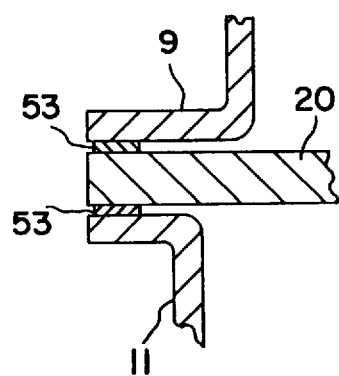
FIG. 5 is a section view of the floating flange 20 in the vicinities of bushing 17.

During operation, any lateral forces which are imparted to the actuator, tend to bind the linear bearing 31 with the central alignment shaft 36. The effect is minimized by having the mounting flange 20 supported to shift horizontally in response to a higher than normal lateral force. Referring to FIGS. 4 and 5, a high temperature, low friction material, such as polyimide 53 may be applied to the top and bottom surfaces of the mounting flange 20 to lower friction and promote sliding movement in response to an excessive lateral force. The bushings 17, have a height of 20 mils greater than the thickness of the mounting flange 20, thus avoiding binding of the lower case 11 or the upper case 9 to flange 20, when a lateral force is exerted between the magnet assembly 8 and stator assembly 7. Flange 20 floats between upper case 9 and lower case 11 but is held in place by a plurality of mounting bolts 30 around the periphery of the flanges of the lower and upper cases 11 and 9.

The upper bolting location on the engine can move with respect to the frame bolting location because of elastomeric isolation disk 10. Spherical bearing assembly 25 will permit rotational movement between the upper and lower mounting locations.

Thus, there is shown an actuator device which may be incorporated in a standard engine mounting structure, which will produce an adequate compensation force for dampening engine induced vibrations. Those skilled in the art will recognize yet other embodiments of the invention as described by the claims which follows.

What is claimed is:

1. A device for dampening vibratory forces induced by an internal combustion engine comprising:

an engine mount including upper and lower casings for attachment to said engine, said upper casing including an elastomeric disk which supports a metal bushing connected to an engine mounting bolt, and said lower casing having means for connecting to a frame of a vehicle; and an electromagnetic actuator disposed within said engine mount, including a stator and magnet assembly connected between said upper and lower casings for imparting a dampening force in opposition to vibratory forces induced by said engine to said frame.

2. The device according to claim 1 wherein said electromagnetic actuator is supported for sliding movement in response to lateral forces between attachment locations of said upper and lower casings.

3. The engine mount actuator according to claim 1 wherein an inner of said first and second coil forms includes a central bore for receiving said alignment shaft.

4. The engine mount actuator according to claim 3 wherein said central bore includes a linear bearing which receives said alignment shaft.

5. An engine mount actuator comprising:

a lower casing, open at one end thereof, adapted to be connected at an opposite end thereof to an automobile frame;

a stator supported within s aid lower casing, having first and second coil forms supporting first and second sets of windings which define a circumferential space coaxial with a force axis a permanent magnet means disposed with in said circumferential space and including an alignment shaft coaxial with said force axis; and an upper casing connected to said lower casing open end, said upper casing including an engine support coupled to said permanent magnet means, wherein a linear force created between said windings and said magnet means displaces said engine support with respect to said automobile frame.

6. The engine mount actuator according to claim 5 wherein said engine support includes an elastomeric isolator disc supported by said upper casing, and an engine support bushing supported by said isolator disc.

7. The engine mount actuator according to claim 6 wherein said engine support bushing receives an engine mounting bolt aligned with said alignment shaft.

8. The engine mount actuator according to claim 7 wherein said engine mounting bolt is coupled to said permanent magnet means with a spherical bearing and bearing cap.

9. An engine mount actuator for damping vibrations comprising:

a lower exterior casing having a closed end for supporting an automobile frame mounting connection, and an opposite open end;

a stator assembly supported in said lower casing comprising: an inner coil form having first and second inner windings coaxially wound about an force axis and an outer coil form supporting third and fourth outer windings spaced from said inner windings and coaxial to said axis;

a moving magnet assembly connected to an alignment shaft, received within a bore of said stator assembly comprising permanent magnet means extending into a space between said inner and outer windings which move axially in response to a force generated between said windings and said magnet assembly;

an upper exterior casing connected at one end to said lower exterior casing open end for supporting an engine mounting member; and bearing means coupling said magnet assembly to said engine mounting member so that an electromagnetic force generated between said windings and said permanent magnet means provides a displacement between said lower casing and said engine mounting member.

10. The engine mount actuator of claim 9 wherein said engine mounting member comprises an elastomeric isolator disc in said upper casing supporting an engine support bushing.

11. The engine mount actuator of claim 10 wherein said alignment shaft is received in a linear bushing contained in said coil inner coil form.

12. An engine mount actuator comprising:

an upper casing open at one end including a bushing connected to an engine mounting bolt, said bushing being laterally supported by an elastomeric isolator disc within said casing;

a lower casing including a frame mounting bolt at one end, and open at another end facing said open end of said upper casing;

a mounting flange supported between said upper and lower casing open ends, said mounting flange supporting a stator comprising:

first and second windings which are coaxial with a force axis, said first and second windings defining a circumferential space for receiving a permanent magnet assembly; and a circumferential magnet assembly which includes magnet means supported in said circumferential space, said assembly being coupled to said engine mounting bolt, said magnet assembly producing a force against said engine mounting bolt in response to a current through said windings.

13. The engine mount actuator of claim 12 wherein said upper and lower casings are fastened together at a said open ends captivating said flange while permitting said flange to move laterally in response to lateral forces applied to said engine mounting bolt.

14. The engine mount according to claim 13 wherein said circumferential magnet assembly includes an alignment shaft received within a bore of said stator which permits vertical movement of said magnet assembly parallel to a force axis of said actuator while maintaining said magnet assembly within said circumferential space.

15. The engine mount actuator according to claim 12 where in each of said windings include an upper and lower winding segment which carry a current in opposite directions, and said magnet means includes upper and lower groups of permanent magnets which are positioned within said circumferential space opposite said upper and lower winding segments, respectively, and which have a north/south orientation which are reverse to each other.

* * * * *